United States Patent [19]

Nemes

[11] Patent Number: 5,121,495

[45] Date of Patent: Jun. 9, 1992

[54] METHODS AND APPARATUS FOR INFORMATION STORAGE AND RETRIEVAL UTILIZING HASHING TECHNIQUES

[75] Inventor: Richard M. Nemes, Brooklyn, N.Y.

[73] Assignee: Bell Communications Research, Inc., Livingston, N.J.

[21] Appl. No.: 430,901

[22] Filed: Oct. 31, 1989

Related U.S. Application Data

[63] Continuation of Ser. No. 151,639, Feb. 2, 1988, abandoned.

[51] Int. Cl.$^5$ .................. G06F 15/411; G06F 12/00
[52] U.S. Cl. ........................... 395/600; 364/222.81; 364/222.82; 364/281.1; 364/282.1; 364/252.3; 364/DIG. 1
[58] Field of Search ... 364/200 MS File, 900 MS File

[56] References Cited

U.S. PATENT DOCUMENTS

| | | | |
|---|---|---|---|
| 4,121,286 | 10/1978 | Venton et al. | 364/900 X |
| 4,215,402 | 7/1980 | Mitchell et al. | 364/200 |
| 4,447,875 | 5/1984 | Bolton et al. | 364/200 |
| 4,502,118 | 2/1985 | Hagenmaier, Jr. et al. | 364/200 |
| 4,716,524 | 12/1987 | Oxley et al. | 364/200 |
| 4,775,932 | 10/1988 | Oxley et al. | 364/200 |

OTHER PUBLICATIONS

"The Art of Computer Programming", Sorting and Searching, D. E. Knuth, Addison-Wesley Series in Computer Science and Information Processing, pp. 506–549, 1973.

"Data Structures with Abstract Data Types and Pascal", D. F. Stubbs and N. W. Webre, Brooks/Cole Publishing Company, 1985, Section 7.4, Hashed Implementations, pp. 310–336.

"Data Structures and Program Design", R. L. Kruse, Prentice-Hall, Inc. 1984, Section 3.7, Hashing, pp. 112–126.

Primary Examiner—Gareth D. Shaw
Assistant Examiner—Paul Kulik
Attorney, Agent, or Firm—James W. Falk

[57] ABSTRACT

A method and apparatus for performing storage and retrieval in an information storage system is disclosed which uses the hashing technique. In order to prevent contamination of the storage medium by automatically expiring records, a garbage collection technique is used which removes all expired records in the neighborhood of a probe into the data storge system. More particularly, each probe for insertion, retrieval or deletion of a record is an occasion to search the entire chain of records found for expired records and then removing them and closing the chain. This garbage collection automatically removes expired record contamination in the vicinity of the probe, thereby automatically decontaminating the storage space. Because no long term contamination can build up in the present system, it is useful for large data bases which are heavily used and which require the fast access provided by hashing.

8 Claims, 6 Drawing Sheets

METHODS AND APPARATUS FOR INFORMATION STORAGE AND RETRIEVAL UTILIZING HASHING TECHNIQUES

This application is a continuation of application Ser. No. 07/151,639, filed Feb. 2, 1988 now abandoned.

TECHNICAL FIELD

This invention relates to information storage and retrieval systems and, more particularly, to the use of hashing techniques in such systems.

BACKGROUND OF THE INVENTION

Information or data stored in a computer-controlled storage mechanism can be retrieved by searching for a particular key in the stored records. The stored record with a key matching the search key is then retrieved. Such searching techniques require repeated accesses or probes into the storage mechanism to perform key comparisons. In large storage and retrieval systems, such searching, even if augmented by efficient search algorithms such as a binary search, often requires an excessive amount of time.

Another well-known and much faster method for storing and retrieving information from computer store involves the use of so-called "hashing" techniques. These techniques are also sometimes called scatter-storage or key-transformation techniques. In a system using hashing, the key is operated upon (by a hashing function) to produce a storage address in the storage space (called the hash table). This storage address is then used to access the desired storage location directly with fewer storage accesses or probes than sequential or binary searches. Hashing techniques are described in the classic text by D. Knuth entitled *The Art of Computer Programming,* Volume 3, *Sorting and Searching,* pp. 506-549, Addison-Wesley, Reading, Mass., 1973.

Hashing functions are designed to translate the universe of keys into addresses uniformly distributed throughout the hash table. Typical hashing operations include truncation, folding, transposition and modulo arithmetic. A disadvantage of hashing techniques is that more than one key can translate into the same storage address, causing "collisions" in storage or retrieval operations. Some form of collision-resolution strategy (sometimes called "rehashing") must therefore be provided. For example, the simple strategy of searching forward from the initial storage address to the first empty storage location will resolve the collision. This latter technique is called linear probing. If the hash table is considered to be circular so that addresses beyond the end of the table map back to the beginning of the table, then the linear probing is done with "open addressing," i.e., with the entire hash table as overflow space in the event that a collision occurs.

Some forms of data records have a limited lifetime after which they become obsolete. Scheduling activities, for example, involves records which become obsolete after the scheduled activity has occurred. Such record storage locations cannot be simply emptied since this location may be a link in a chain of locations previously created during a collision-resolution procedure. The classic solution to this problem is to mark the record as "deleted" rather than as "empty," and to leave the record in place. In time, however, the storage space can become contaminated by an excessive number of deleted or obsolete storage locations that must be searched to locate desired records. With the passage of time, such storage contamination can reduce the performance of retrieval operations below acceptable levels. Problems of this type are discussed in considerable detail in *Data Structures and Program Design,* by R. L. Kruse, Prentice-Hall, Englewood Cliffs, N.J., 1984, pp. 112-126, and *Data Structures with Abstract Data Types and PASCAL,* by D. F. Stubbs and N. W. Webre, Brooks/Cole Publishing, Monterey, Calif., 1985, pp. 310-336.

In the prior art, such storage space contamination was avoided by deletion procedures that eliminated deleted records by replacing the deleted record with another record in the collision-resolution chain of records and thus close the chain without leaving any deleted records. One such procedure is shown in the aforementioned text by Knuth at page 527. Unfortunately, such non-contaminating procedures, due to the necessity for successive probes into the storage space, take so much time that they can be used only when the data base is off line and hence not available for accessing.

The problem, then, is to provide the speed of access of hashing techniques for large and heavily used information storage systems having expiring data and, at the same time, prevent the large-scale contamination which normally results from expired records in such large and heavily used systems.

SUMMARY OF THE INVENTION

In accordance with the illustrative embodiment of the invention, these and other problems are overcome by using a garbage collection procedure "on the fly" while other types of access to the storage space are taking place. In particular, during normal data insertion or retrieval probes into the data store, the expired, obsolete records are identified and removed in the neighborhood of the probe. Specifically, expired or obsolete records in the collision-resolution chain including the record to be accessed are removed as part of the normal retrieval procedure.

This incremental garbage collection technique has the decided advantage of automatically eliminating contamination caused by obsolete or expired records without requiring that the data base be taken off-line for such garbage collection. This is particularly important for data bases requiring rapid access and continuous availability to the user population.

BRIEF DESCRIPTION OF THE DRAWING

A complete understanding of the present invention may be gained by considering the following detailed description in conjunction with the accompanying drawing, in which.

To facilitate reader understanding, identical reference numerals are used to designate elements common to the figures.

DETAILED DESCRIPTION

Figure 1:
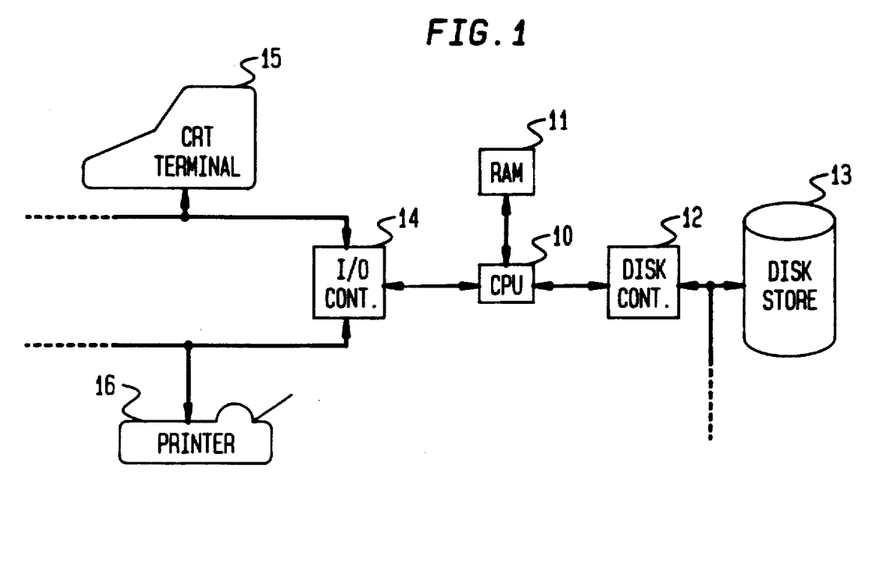
FIG. 1 shows a general block diagram of a computer system hardware arrangement in which the information storage and retrieval system of the present invention might be implemented.

Referring more particularly to FIG. 1 of the drawings, there is shown a general block diagram of a computer hardware system comprising a Central Processing Unit (CPU) 10 and a Random Access Memory (RAM) unit 11. Computer programs stored in the RAM 11 are accessed by CPU 10 and executed, one instruction at a time, by CPU 10. Data, stored in other portions of RAM 11, are operated upon by the program instructions accessed by CPU 10 from RAM 11, all in accordance with well-known data processing techniques.

Central Processing Unit (CPU) 10 also controls and accesses a disk controller unit 12 which, in turn, accesses digital data stored on one or more disk storage units such as disk storage unit 13. In normal operation, programs and data are stored on disk storage unit 13 until required by CPU 10. At this time, such programs and data are retrieved from disk storage unit 13 in blocks and stored in RAM 11 for rapid access.

Central Processing Unit (CPU) 10 also controls an Input-Output (IO) controller 14 which, in turn, provides access to a plurality of input devices such as CRT (cathode ray tube) terminal 15, as well as a plurality of output devices such as printer 16. Terminal 15 provides a mechanism for a computer operator to introduce instructions and commands into the computer system of FIG. 1, and may be supplemented with other input devices such as card and tape readers, remotely located terminals, optical readers and other types of input devices. Similarly, printer 16 provides a mechanism for displaying the results of the operation of the computer system of FIG. 1 for the computer user. Printer 16 may similarly be supplemented by line printers, cathode ray tube displays, phototypesetters, graphical plotters and other types of output devices.

The constituents of the computer system of FIG. 1 and their cooperative operation are well-known in the art and are typical of all computer systems, from small personal computers to large main frame systems. The architecture and operation of such systems are well-known and, since they form no part of the present invention, will not be further described here.

Figure 2:
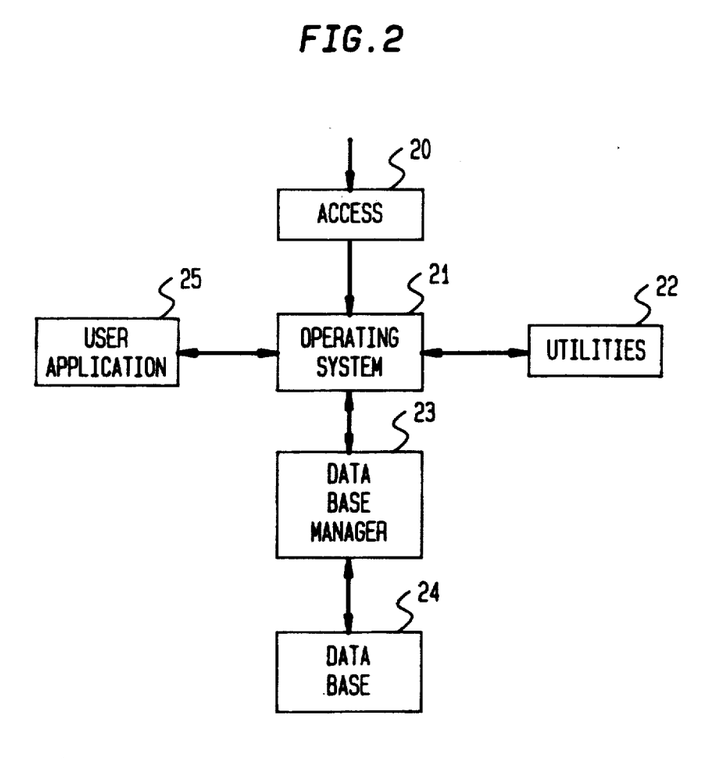
FIG. 2 shows a general block diagram of a computer system software arrangement in which the information storage and retrieval system of the present invention might find use.

In FIG. 2 there is shown a graphical representation of a typical software architecture for a computer system such as that shown in FIG. 1. The software of FIG. 2 comprises an access mechanism 20 which, for simple personal computers, may comprise no more than turning the system on. In larger systems, providing service to a larger number of users, login and password procedures would typically be implemented in access mechanism 20. Once access mechanism 20 has completed the login procedure, the user is placed in the operating system environment 21. Operating system 21 coordinates the activities of all of the hardware components of the computer system (shown in FIG. 1) and provides a number of utility programs 22 of general use to the computer user. Utilities 22 might, for example, comprise assemblers and compilers, mathematical routines, basic file handling routines and system maintenance facilities.

Many computer software systems also include a data base manager program 23 which controls access to the data records in a data base 24. Data base 24 may, for example, reside on a disk storage unit or units such as disk storage unit 13 of FIG. 1. User application programs such as application program 25 then use the data base manager program 23 to access data base records in data base 24 for adding, deleting and modifying data records. It is the efficient realization of a data base manager such as data base manager program 23 in FIG. 2 to which the present invention is directed.

Before proceeding to a description of one embodiment of the present invention, it is first useful to discuss hashing techniques in general. Hashing techniques have been used classically for very fast access to static, short term data such as a compiler symbol table. Typically, in such storage tables, deletions are infrequent and the need for the storage table disappears quickly.

In some common types of data storage systems, data records become obsolete merely by the passage of time or by the occurrence of some event. If such expired, lapsed or obsolete records are not removed from the storage table, they will, in time, seriously degrade or contaminate the performance of the retrieval system. Contamination arises because of the ever-increasing need to search longer and longer chains of record locations, many of which are expired, to reach a desired location.

More particularly, a hash table can be described as a logically contiguous, circular list of consecutively numbered, fixed-sized storage units, called cells, each capable of storing a single item called a record. Each record contains a distinguishing field, called the key, which is used as the basis for storing and retrieving the associated record. The keys throughout the hash table data base are distinct and unique for each record. Hashing functions which associate keys with storage addresses are usually not one-to-one in that they map many distinct keys into the same location.

To store a new record, a cell number is generated by invoking the hashing function on the key for the new record. If this cell location is not occupied, the new record is stored there. If this cell location is occupied, a collision has occurred and the new record must be stored elsewhere, in an overflow area, using an appropriate collision-resolution technique. A common collision-resolution strategy, which will be described here, is known as linear probing under open addressing. Open addressing means that the overflow area is the entire hash table itself. Linear probing indicates sequential scanning of cells beginning with the next cell, recalling that the storage table is viewed circularly. The collision is resolved by storing the record in the first unoccupied cell found.

To retrieve a record, the key is hashed to generate a cell location. If the record is not there (the keys do not match), searching continues following the same forward path as record storage. An empty cell terminates the retrieval procedure, which has then failed to find the record to be retrieved.

Figure 3:
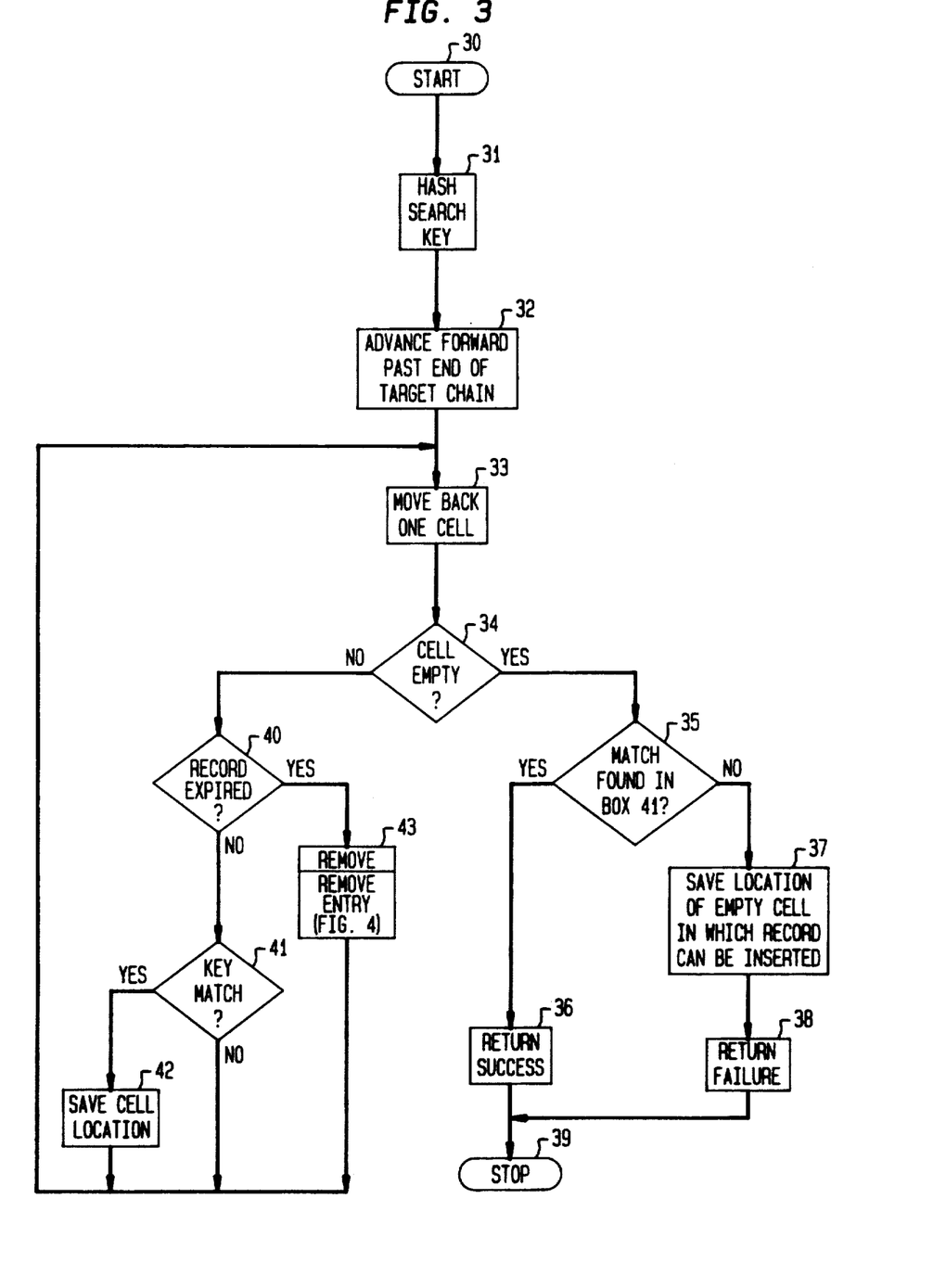
FIG. 3 shows a general flow chart for table searching operation which might be used in a hashed storage system in accordance with the present invention.

In FIG. 3 there is shown a flowchart of a *search table* procedure for searching the hash table preparatory to inserting, retrieving or deleting a record. The hash table may, for example, comprise the data base 24 of FIG. 2 and the *search table* procedure of FIG. 3 comprise a portion of the data base manager 23 of FIG. 2. Starting in box 30 of the *search table* procedure of FIG. 3, the search key of the record being searched for is hashed in box 31 to provide the address of a cell. In box 32, the empty cell just past the end of the search chain of non-empty cells is located, i.e., the first succeeding unoccupied cell is found. In box 33, the procedure moves one cell backward from the current cell position (now at the end of the chain). Decision box 34 examines the cell to determine whether the cell is empty or not. If the cell tested in decision box 34 is empty, decision box 35 is entered to determine if a key match was previously found in decision box 41 (as will be described below). If so, the search is successful and returns success in box 36 and terminates in terminal box 39. If not, box 37 is entered where the location of the empty cell is saved for possible record insertion. In box 38 failure is returned since an empty cell was found before a cell with a matching key. The procedure again terminates in box 39.

If the cell tested in decision box 34 is not empty, decision box 40 is entered to determine if the record in that cell has expired. This is determined by comparing some portion of the contents of the record to some external condition. A timestamp in the record, for example, could be compared with the time-of-day. Alternatively, the occurrence of an event can be compared with a field identifying that event in the record. In any event, if the record has not expired, decision box 41 is entered to determine if the key in this record matches the search key. If it does, the cell location is saved in box 42 and the procedure returns to box 33. If the record key does not match the search key, the procedure returns directly to box 33.

If decision box 40 determines that the record has expired, box 43 is entered to perform a non-contaminating deletion of the expired record, as will be described in connection with FIG. 4. In general, the procedure of box 43 (FIG. 4) operates to move a record further toward the end of the chain into the position of the record which has expired, thereby removing the expired record and, at the same time, closing the search chain.

It can be seen that the *search table* procedure of FIG. 3 operates to examine the entire chain of records of which the searched-for record is a part, and to delete expired records by chain-filling rather than by marking such records as deleted. In this way, contamination of the storage space by expired records is removed in the vicinity of each new table search. If contamination becomes too large even with such automatic garbage collection, then the insertion of new records can be inhibited until the *search table* procedure has had a chance to remove a sufficient number of expired records to render the operation of the system sufficiently efficient.

The *search table* procedure illustrated generally in FIG. 3 is implemented in the Appendix as PASCAL-like pseudocode. Source code suitable for compilation and execution on any standard hardware and software computing system can readily be devised from this pseudocode and the flowcharts of the figures by any person of ordinary skill in the art.

Figure 4:
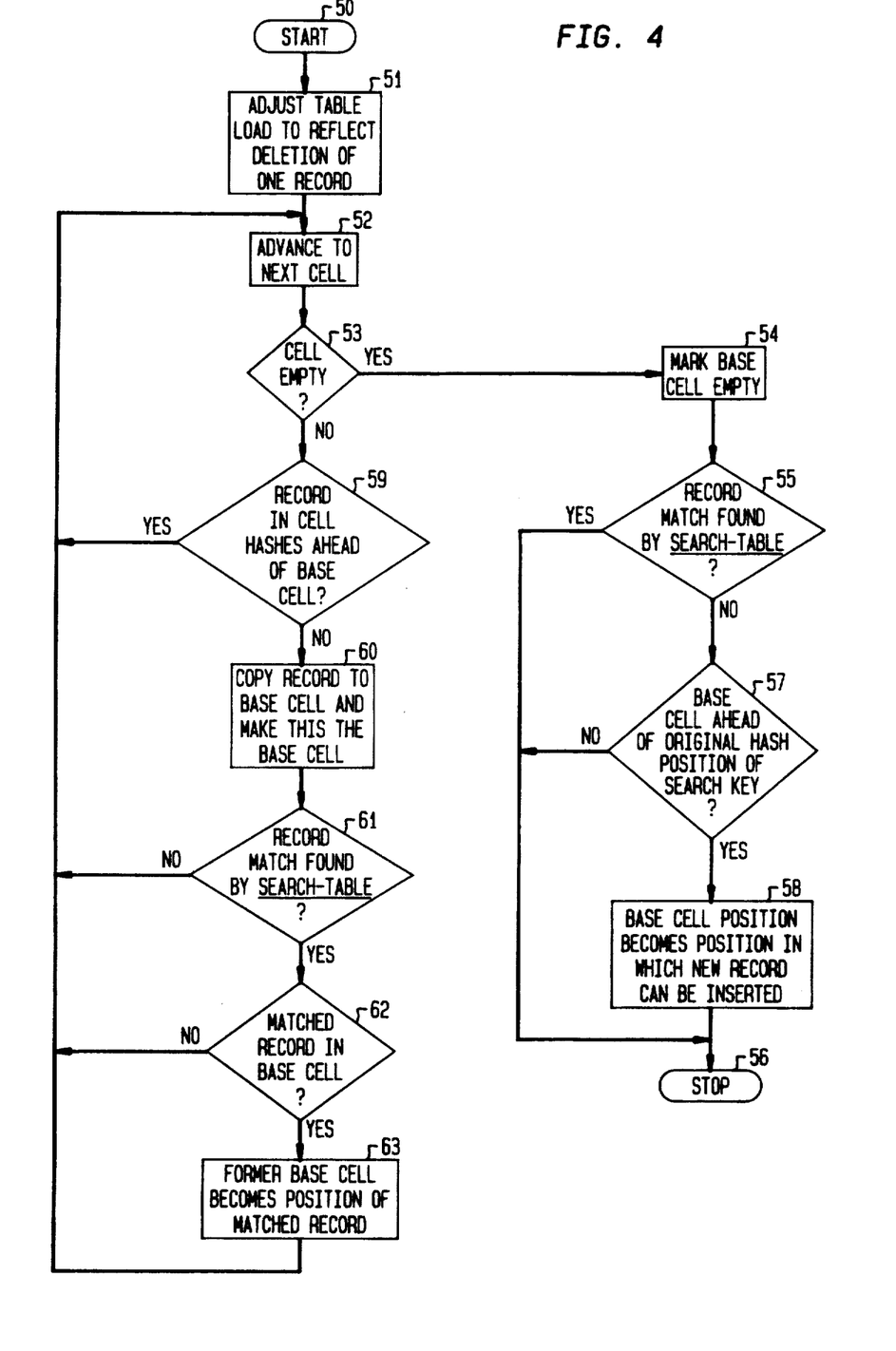
FIG. 4 shows a general flow chart for a garbage collecting remove procedure which forms part of the table searching operation of FIG. 3.

In FIG. 4 there is shown a flowchart of a *remove* procedure which removes records from the database, either records to be deleted or expired records. In general, this is accomplished by traversing the chain of the record to be removed in a forward direction searching for a record whose key hashes at or behind the cell to be removed. When such a record is found, it is copied to the cell of the record to be removed. The copied record is then taken as the record to be removed and the process is continued until the end of the search chain is reached. In box 54, the final copied record is marked empty prior to teminating the procedure. The *remove* procedure of FIG. 4 might comprise a portion of the data base manager program 23 of FIG. 2.

Starting at starting box 50 of FIG. 4, the procedure is entered with the location of a cell to be removed which is called the base cell. Initially, box 51 is entered where the load count in the table is adjusted to reflect the removal of one record. The load, of course, is the number of occupied cells. As previously noted, the value of this load can be used to disable the insertion of new records until the load has reached a low enough value to permit efficient searching. In box 52, the procedure of FIG. 4 advances to the next cell in the chain beyond the base cell. In decision box 53 this cell is tested to see if it is empty. If it is empty, the end of the chain has been reached and box 54 is entered to mark the base cell as empty. Decision box 55 is then entered to determine if a record was found (by the *search table* procedure) which matched the search key and, if so, the procedure is terminated in terminal box 56. If a matching record was not found, decision box 57 is entered to determine if the base cell is ahead of the hash location of the search key. If not, the procedure is terminated in box 56. If the base cell does hash ahead of the search record, then the base cell can be used for storing a new record. In box 58, the location of this empty cell is therefore saved as a possible insertion site.

Returning to box 53, if the next cell is not empty, box 59 is entered to determine if the record in this cell hashes ahead of the base cell. If so, box 52 is re-entered to advance to the next cell in the chain. If this next cell hashes at or behind the base cell, however, box 60 is entered to copy the contents of this next cell to the base cell, thereby obliterating (removing) the base cell contents. Box 61 is then entered to test if the *search table* procedure found a matching record. If not, box 52 is re-entered to advance to the next cell. If a matching record was found, decision box 62 is entered to test if the matching record is the base cell record. If not, box 52 is re-entered to advance to the next cell. If the matching record is the base cell, however, box 63 is entered to store the location of the former base cell as the position of the matching record and then box 52 is re-entered to advance to the next cell in the search chain.

It can be seen that the procedure of FIG. 4 operates to examine the entire search chain and to move records from later positions in the chain to vacated positions in the chain such that the chain is entirely closed at the end of the procedure. That is, no empty cells are left to erroneously break up a search chain. As noted in connection with FIG. 3, expired records are subjected to the *remove* procedure of FIG. 4. As will be noted in connection with FIG. 7, records to be deleted from the data base are also subjected to the *remove* procedure of FIG. 4.

The *remove* procedure illustrated generally in FIG. 4 is implemented in the Appendix as PASCAL-like pseudocode. Source code suitable for compilation and execution on any standard hardware and software computing system can readily be devised from this pseudocode and the flowchart of FIG. 4 by any person of ordinary skill in the art.

Figure 5:
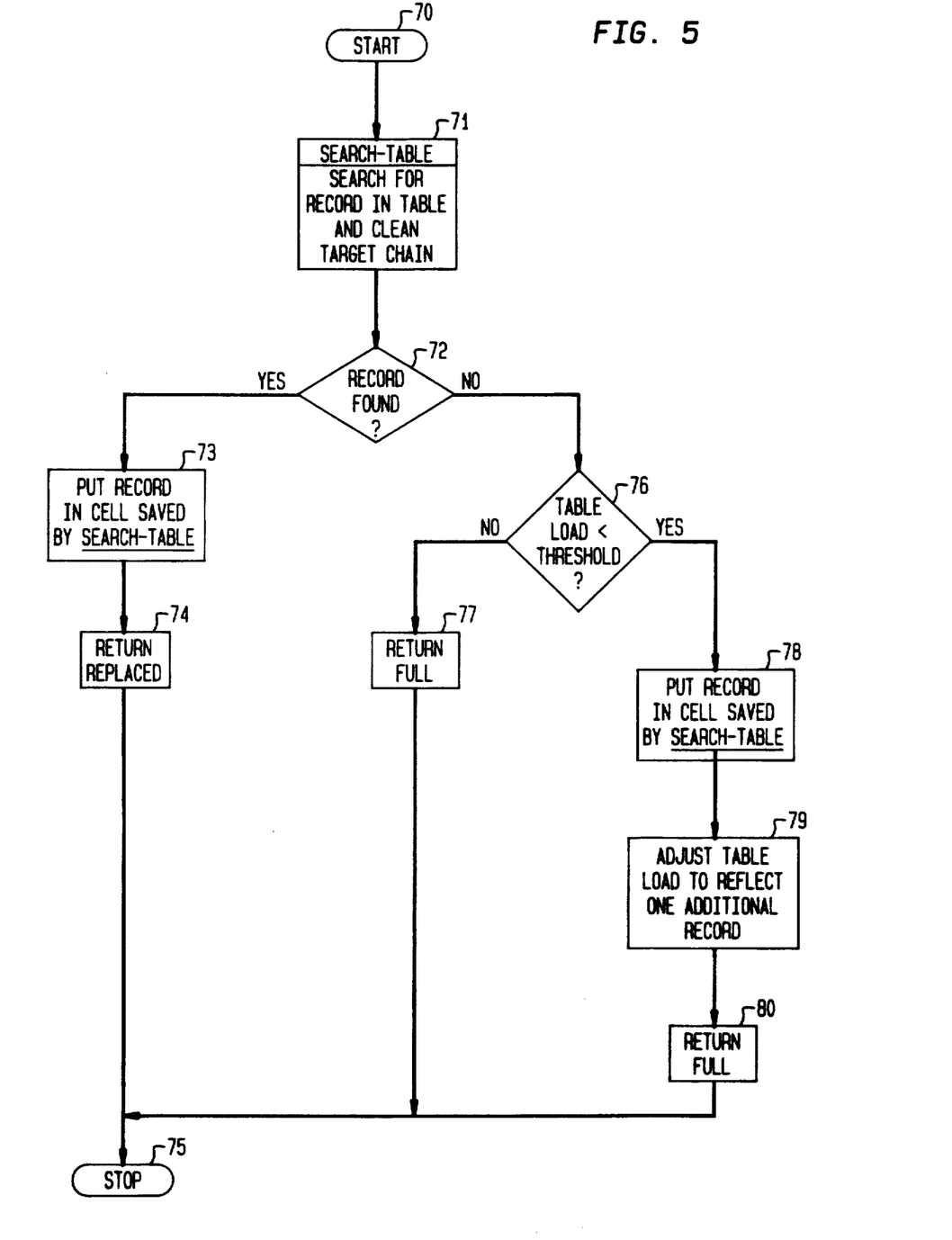
FIG. 5 shows a general flow chart for record insertion operations which might be used in a hashed storage system in accordance with the present invention.

In FIG. 5 there is shown a detailed flowchart of an *insert* procedure suitable for use in the information storage and retrieval system of the present invention. The *insert* procedure of FIG. 5 begins as starting box 70 from which box 71 is entered. In box 71, the *search table* procedure of FIG. 3 is invoked with the search key of the record to be inserted. As noted in connection with FIG. 3, the *search table* procedure locates the target cell location and, if part of a search chain, removes all expired cells from that search chain. Decision box 72 is then entered where it is determined whether or not the *search table* procedure found a record with a matching key. If so, box 73 is entered where the record to be inserted in put into the storage table in the position of the old record with a matching key. In box 74, the *insert* procedure reports that the old record has been replaced by the new record and the procedure is terminated in terminal box 75.

Returning to decision box 72, if a matching record is not found, decision box 76 is entered to determine if the table load is below a preselected threshold (typically about 75% of the table capacity). If the load is not below the threshold, the storage table is too full to be access efficiently, and box 77 is entered to report that the the table is full and the record cannot be inserted. The procedure then terminates in terminal box 75. If the load is below the threshold, box 78 is entered where the record to be inserted is placed in the empty cell position found by the *search table* procedure. In box 79, the load is adjusted to reflect the addition of one record to the storage table, the procedure reports that the record was inserted in box 80 and the procedure terminated in box 75.

The *insert* procedure illustrated generally in FIG. 5 is implemented in the Appendix as PASCAL-like pseudocode. Source code suitable for compilation and execution on any standard hardware and software computing system can readily be devised from this pseudocode and the flowcharts of the FIG. 5 by any person of ordinary skill in the art.

Figure 6:
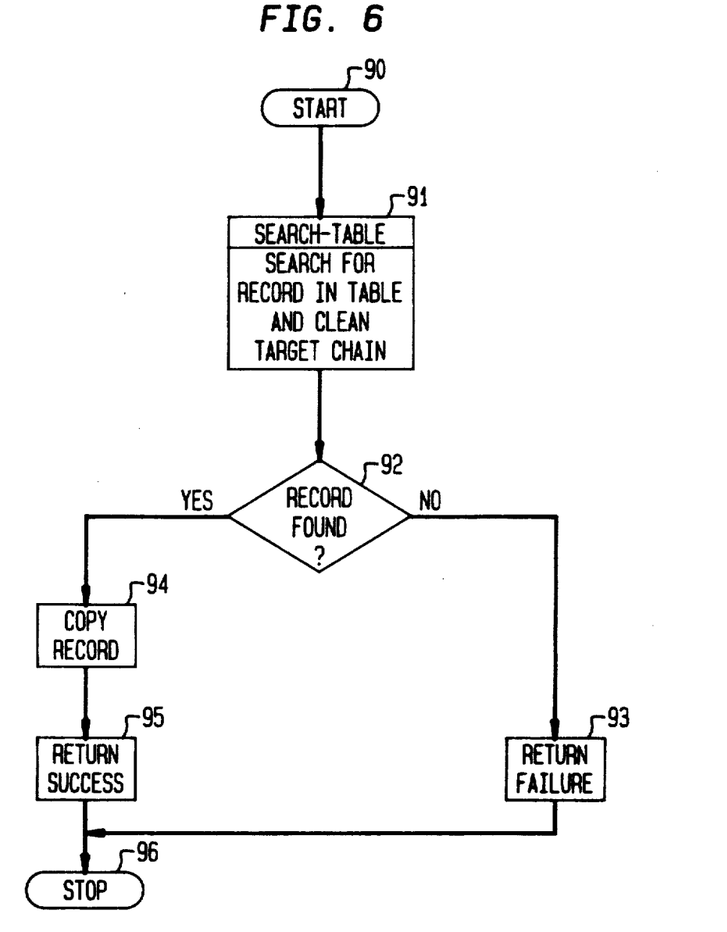
FIG. 6 shows a general flow chart for a record retrieval operation for use in a hashed storage system in accordance with the present invention.

In FIG. 6 there is show a detailed flowchart of a *retrieve* procedure which is used to retrieve a record from the data base 24 of FIG. 2. Starting in box 90, the *search table* procedure is invoked in box 91, using the key of the record to be retrieved as the search key. In box 92 it is determined if a record with a matching key was found by the *search table* procedure. If not, box 93 is entered to report failure of the *retrieve* procedure and the procedure is terminated in box 96. If a matching record was found, box 94 is entered to copy the matching record into a buffer store for processing by the calling program, box 95 is entered to return an indication of successful retrieval and the procedure terminated in box 96.

The pseudo-code for the *retrieve* procedure of FIG. 6 is included in the Appendix. Executable code for all common hardware and system software arrangements can readily be devised by those skilled in the art from the flowchart and the pseudo-code.

Figure 7:
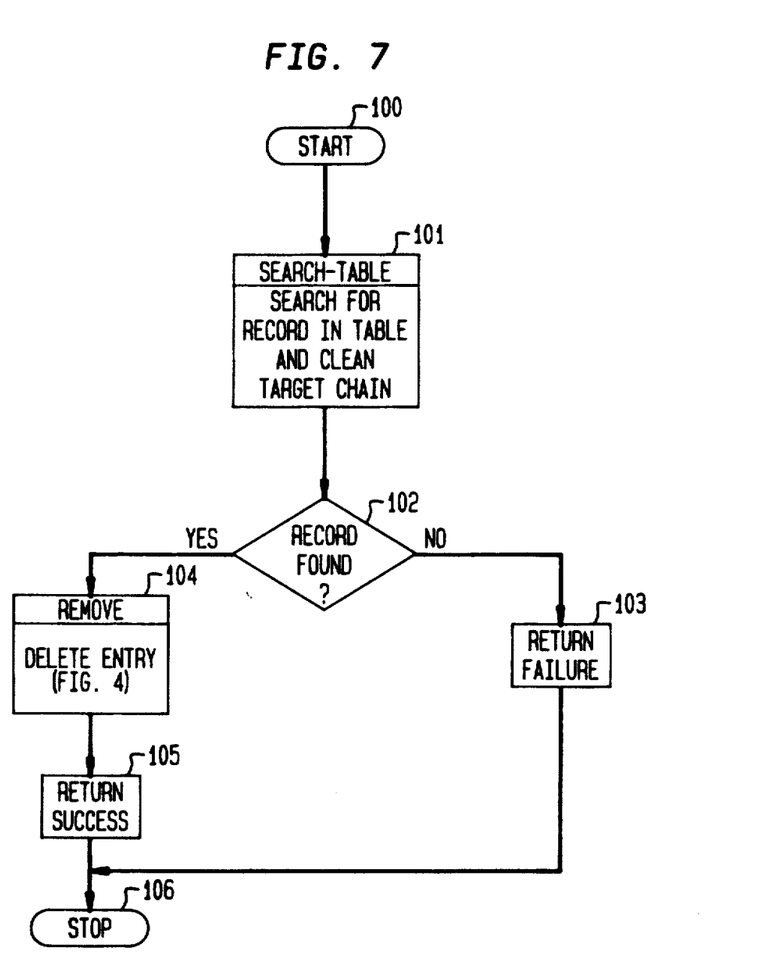
FIG. 7 shows a general flow chart for a record deletion operation which might be used in the hashed storage system in accordance with the present invention.

In FIG. 7 there is shown a detailed flowchart of a *delete* procedure useful for actively removing records from the data base 24 of FIG. 2. Starting at box 100, the procedure of FIG. 7 first invokes the *search table* procedure of FIG. 3 in box 101, using the key of the record to be deleted as the search key. In box 102, it is determined if the *search table* procedure was able to locate a record with a matching key. If not, box 103 is entered to report failure of the deletion procedure and the procedure is terminated in box 106. If a matching record was found, as determined by box 102, the *remove* procedure of FIG. 4 is invoked in box 104. As noted in connection with FIG. 4, this procedure removes the record to be deleted and, at the same time, closes the search chain. Box 105 is then entered to report successful deletion to the calling program and the procedure is terminated in box 106.

The *delete* procedure illustrated generally in FIG. 7 is implemented in the Appendix as PASCAL-like pseudocode. Source code suitable for compilation and execution on any standard hardware and software computing system can readily be devised from this pseudocode and the flowchart of FIG. 7 by any person of ordinary skill in the art.

The attached Appendix contains pseudocode listings for all of the programmed functions necessary to implement a data base manager 23 (FIG. 2) operating in accordance with the present invention. These listings follow the flowcharts of FIGS. 3–7 and further explain and elucidate the flowcharts. Any person of ordinary skill in the art will have no difficulty implementing these functions in any desired program language to run on any desired computer hardware configuration.

It should also be clear to those skilled in the art that further embodiments of the present invention may be made by those skilled in the art without departing from the teachings of the present invention.

APPENDIX

Functions Provided

The following functions are made available to the application program:

insert (record: record type)

Returns replaced if a record associated with record.key was found in the table and subsequently replaced.

Returns inserted if a record associated with record.key was not found in the table and the passed record was subsequently inserted.

Returns full if a record associated with record.key was not found in the table and passed record could not be inserted because load factor has reached max load factor.

retrieve (record: record type)

Returns success if record associated with record.key was found in the table and assigned to record.

Returns failure if search was unsuccessful.

delete (record key: record key type)

Returns success if record associated with record key was found in the table and subsequently deleted Returns failure if none found.

Definitions

The following formal definitions are required for specifying the insertion, retrieval, and deletion algorithms:

const table size        /* size of hash table */

```
const max_load_factor    /* 0 ≤ max load factor < 1 */ var table: array[0 .. table_size-1] of record_type;
            /* hash table */ var load: 0 .. table_size-1;
            /* number of occupied entries of
               hash table array (initially 0) */

Algorithms

Algorithms for the functions described above are
given below:
function insert (record: record_type):
        (replaced, inserted, full );

var position: 0 .. table_size-1;
            /* position in table to update or
               insert (returned by search_table) */ begin if search_table (record.key, position)

then begin table[position] := record;
                return (replaced)

end else if load/table_size < max_load_factor then begin load := load+1;
                    table[position] := record;
                    return (inserted)

end else return (full)

end         /* insert */ function retrieve (var record: record_type):
        (success, failure);

var position: 0 .. table_size-1;
            /* position in table where record
               resides (returned by search_table) */ begin if search_table (record.key, position)

then begin record := table[position];
                return (success)

end else return (failure)

end     /* retrieve */ function delete (record_key: record_key_type):
        (success, failure);

var position: 0 .. table_size-1;
            /* position in table where record
               resides (returned by search_table) */ dummy_variable: 0 .. table_size-1;
            /* last two arguments to remove are
               not relevant here                    */ begin if search_table (record_key, position)

then begin remove (position, true, dummy_variable,
                        dummy_variable);

return (success)

end else return (failure)

end     /* delete */ function search_table (record_key: record_key_type;
        var position: 0 .. table_size-1): boolean;

/* search table for record_key and delete expired
       expired records in target chain; position is set to
       index of found record or appropriate empty cell */ var i: 0 .. table_size-1;
            /* used for scanning chain,
               both forwards & backwards */ pos_empty: 0 .. table_size-1;
            /* index of leftmost empty cell
               to right of position */ is_rec_found: boolean;
            /* indicates whether search is successful */ begin position := hash (record_key);
        is_rec_found := false;

if table[position] is not empty then begin
                i := position; /* loop initialization */
                repeat      /* scan forward to end of chain
                                containing table[position] */ i := (i+1) mod table_size until (table[i] is empty);

pos_empty := i;
                i := (i-1+table_size) mod table_size;

while (table[i] is not empty) do
                    /*scan chain in reverse,
                      deleting expired entries */ begin if table[i] is expired
                            then remove (i, is_rec_found,
                                        position, pos_empty)

else if table[i].key = record_key
```

```
            then begin is_rec_found := true;
                  position := i end;

i := (i-1+table_size) mod table_size end;   /* while */ if not is_rec_found then position := pos_empty end;   /* then */ return (is_rec_found)

end                 /* search table */
procedure remove (cell_to_del:
   0 .. table_size-1; is_rec_found: boolean;
   var pos_of_search_rec, pos_empty: 0 .. table_size-1;

/* Delete table[cell_to_del] */ var i, j: 0 .. table_size-1;

begin load := load-1;

do forever i := cell_to_del;
                  /* save position of emptied slot */ repeat         /* scan forward looking for a
                        record to fill hole in chain */ cell_to_del := (cell_to_del+1) mod table_size;

if table[cell_to_del] is empty then begin table[i] := empty;

if not is_rec_found then if (pos_of_search_rec ≤ i < pos_empty)
                  or (i< pos_empty < pos_of_search_rec)
                  or (pos_empty< pos_of_search_rec ≤
                  i) then pos_empty := i;

return
            end;

i := hash (table[cell_to_del].key)

until (i ≤ i < cell_to_del)
      or (i < cell_to_del < i)
      or (cell_to_del< i ≤ i);

table[i] := table[cell_to_del];
      /* use table[cell_to_del] to plug hole in chain */ if (is_rec_found) and
         (pos_of_search_rec = cell_to_del)
      then pos_of_search_rec := i end end       /* remove */
```

What is claimed is:

1. An information storage and retrieval system using hashing techniques to provide rapid access to the records of said system and utilizing a linear probing technique to store records with the same hash address, at least some of said records automatically expiring, said system comprising a record search means utilizing a search key to access a chain of records having the same hash address, said record search means including means for identifying and removing all expired ones of said records from said chain of records each time said chain is accessed, and means, utilizing said record search means, for inserting retrieving and deleting records from said system and, at the same time, removing all expired ones of said records in the accessed chains of records.

2. The information storage and retrieval system according to claim 1 further comprising means for recursively moving a record from a later position in said chain of records into the position of one of said expired records.

3. The information storage and retrieval system according to claim 1 further including means for counting the number of records in said system, means, responsive to said counting means, for inhibiting the insertion of new records into said system when the number of records in said system exceeds a preselected value.

4. The information storage and retrieval system according to claim 3 further including means, also responsive to said counting means, for re-enabling the insertion of new records into said system when the number of records in said system falls below said preselected value.

5. A method for storing and retrieving information records using hashing techniques to provide rapid access to said records and utilizing a linear probing technique to store records with the same hash address, at least some of said records automatically expiring, said method comprising the steps of accessing a chain or records having the same hash address, identifying the automatically expired ones of said records, removing all automatically expired records from said chain of records each time said chain is accessed, and inserting, retrieving or deleting one of said records from said system following said step of removing.

6. The method according to claim 5 further comprising the step of moving a record from a later position in said chain of records into the position of one of said expired records.

7. The method according to claim 5 further comprising the steps of counting the number of records in said system, and inhibiting the insertion of new records into said system when the number of records in said system rises above a preselected value.

8. The method according to claim 7 further comprising the step of re-enabling the insertion of new records into said system when the number of records in said system falls below said preselected value.

* * * * *